(No Model.)  2 Sheets—Sheet 1.

J. DUNSTEDTER.
WHEEL.

No. 375,056. Patented Dec. 20, 1887.

WITNESSES:  
INVENTOR:  
Jacob Dunstedter  
by C. D. Moody, atty (No Model.) 2 Sheets—Sheet 2.
J. DUNSTEDTER.
WHEEL.
No. 375,056. Patented Dec. 20, 1887.
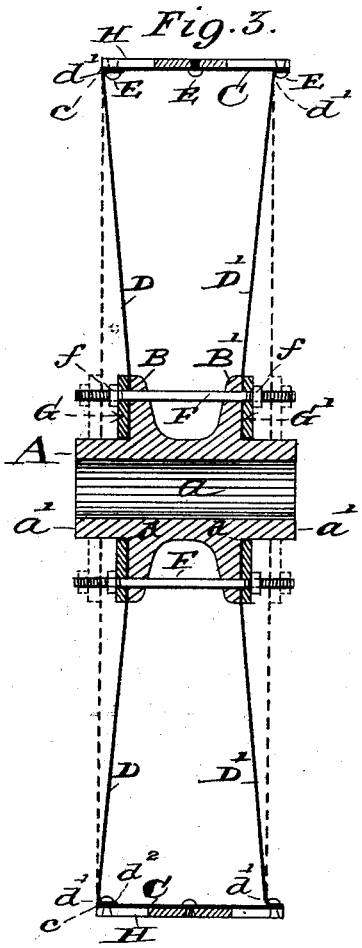
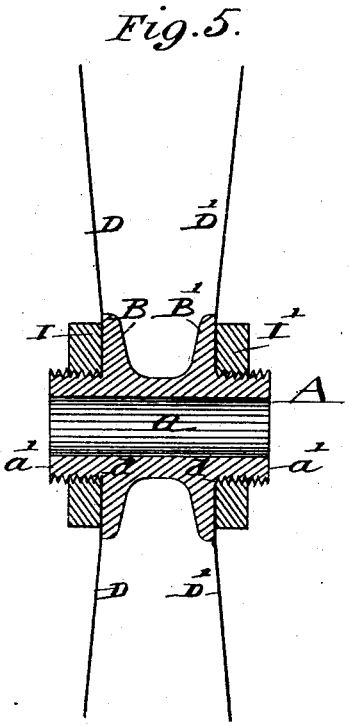
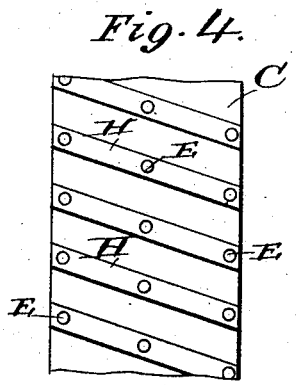
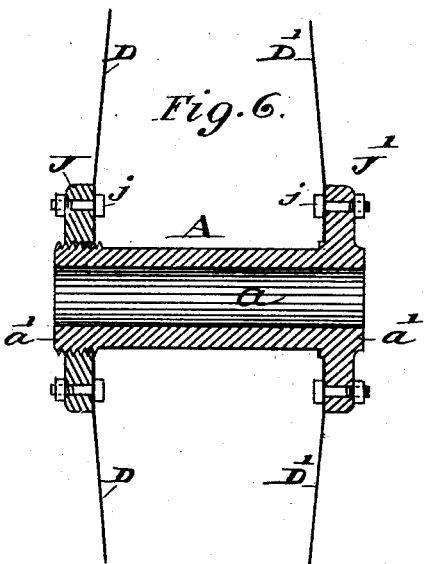
Witnesses:
Inventor:
Jacob Dunstedter
by C. D. Moody, atty

UNITED STATES PATENT OFFICE.

JACOB DUNSTEDTER, OF EDWARDSVILLE, ILLINOIS.

WHEEL.

SPECIFICATION forming part of Letters Patent No. 375,056, dated December 20, 1887.

Application filed August 27, 1887. Serial No. 248,074. (No model.)

*To all whom it may concern:*

Be it known that I, JACOB DUNSTEDTER, of Edwardsville, Illinois, have made a new and useful Improvement in Wheels, of which the following is a full, clear, and exact description.

This improved wheel is made hollow, and is mainly composed of a hub, a rim, and two disks which respectively form the sides of the wheel and serve to unite the hub and rim.

Its leading feature is the mode of constructing the sides of the wheel and holding them in place.

Figure 1:
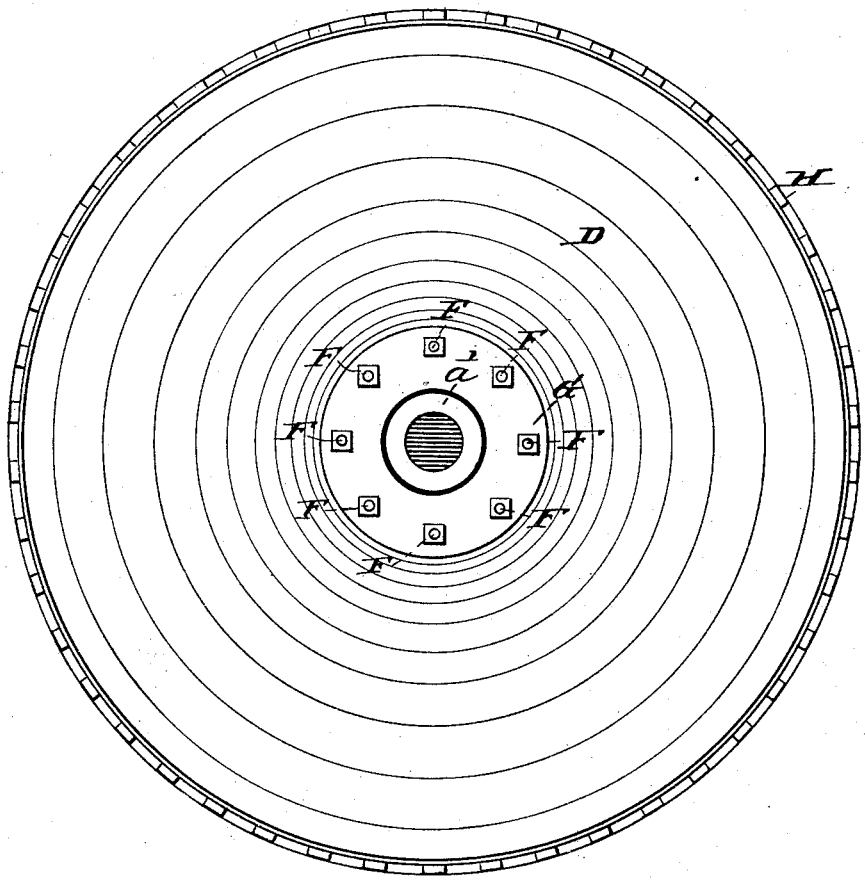
Figure 2:
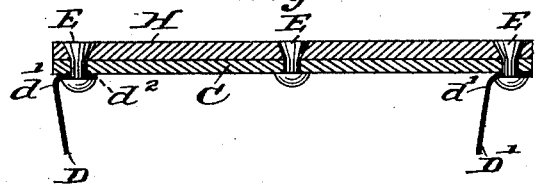

In the annexed drawings, making part of this specification, Figure 1 is a side elevation of the inner side of the improved wheel. Fig. 2 is an enlarged cross-section of the rim portion of the wheel. Fig. 3 is a central cross-section of the wheel, the broken lines indicating the position of its sides before being dished. Fig. 4 is a plan of a portion of the rim. Fig. 5 is a cross-section of the central portion of the wheel, showing a modified means for holding the sides in place; and Fig. 6 illustrates the dishing outwardly of the sides.

The same letters of reference denote the same parts.

A represents the hub. It is perforated at $a$, in the customary manner, to admit a carriage-axle or whatever bearing the wheel is designed to turn upon, and externally it is provided with two collars, B B'.

The rim of the wheel is shown at C, and D D', respectively, represent the sides of the wheel. The bolts or rivets E serve to connect the rim and the sides of the wheel, and the sides and the hub are connected as follows: The sides are perforated at $d$, to provide for any axle or bearing and to pass onto any projection, $a'$, of the hub.

F F represent bolts passing through the collars B B' and the sides D D', and also, preferably, through the washers G G', which in practice it is desirable to employ. By screwing up the nuts $f$ upon the bolts F the washers are drawn, respectively, against the sides D D', and the sides are drawn against the collars B B', respectively, as shown in Fig. 2. As the collars are nearer together than the peripheries $d'$ of the sides, a dished form is imparted to the sides and the wheel thereby stiffened and strengthened. The hub is usually of cast metal, and the rim and sides of sheet metal. The wheel can thus be made very light, even when a wide rim is used. An additional advantage is also obtained—the wheel throws less dirt than those hitherto in use. The sides D D' do not lift the earth, and by connecting the inner side, D, with the rim, as shown, making the periphery $d'$ even with the edge $c$ of the rim, and turning the flange $d^2$ inward, as shown, the rim is prevented substantially from lifting the earth at the side toward the vehicle, something especially desirable in a traction-engine, to which this improved wheel mainly belongs. The same bolts or rivets E used in connecting the sides and rim may also serve to attach the customary lugs, H, upon the rim.

In place of extending the bolts F entirely through the wheel, as shown, two sets of bolts may be used, respectively, at the inner and at the outer side of the wheel—that is, the bolts at the inner side may connect the inner side, D, with the nearest collar, B, and those at the outer side of the wheel may connect the side D' with the collar B'. The collars B B' preferably extend entirely around the hub. The collars may be braced apart by any supplementary construction. (Not shown.) This construction may answer for a pulley as well as for a wheel. The lugs serve to strengthen the rim.

In Fig. 5 a modified means is employed for holding the dished sides D D', respectively, against the collars B B'. In the place of bolts F, the nuts I I' may be screwed onto the ends $a'\ a'$ of the hub and against the sides D D', substantially as shown; and if it is desired to draw the sides D D' outwardly instead of inwardly they, by means of bolts $j$, may be secured to the collars J J', respectively, as shown in Fig. 6. One or both of the collars J J' should be in the form of a nut, or otherwise made movable upon the wheel-hub, substantially as shown.

I claim—

A wheel or pulley whose sides D D' are sprung inward against collars or other shoulders upon the hub, substantially as described.

Witness my hand.

JACOB DUNSTEDTER.

Witnesses:
    E. D. GILLESPIE,
    G. B. CRANE.